(12) United States Patent
Terrell (10) Patent No.: US 10,993,377 B1
(45) Date of Patent: May 4, 2021

(54) VINE CUTTING TOOL AND METHOD FOR MAKING AND USING SAME

(71) Applicant: David L. Terrell, Indianapolis, IN (US)

(72) Inventor: David L. Terrell, Indianapolis, IN (US)

(\*) Notice: Subject to any disclaimer, the term of this patent is extended or adjusted under 35 U.S.C. 154(b) by 0 days.

(21) Appl. No.: 15/789,305

(22) Filed: Oct. 20, 2017

Related U.S. Application Data (63) Continuation of application No. 14/067,418, filed on Oct. 30, 2013, now abandoned.

(51) Int. Cl.
*A01G 3/00* (2006.01)

(52) U.S. Cl.
CPC ...................................... *A01G 3/00* (2013.01)

(58) Field of Classification Search
CPC .. B26B 21/56; B26B 9/02; B26B 3/00; A01G 3/00
USPC ........................... 30/346.55, 357, 314; 83/14
See application file for complete search history.

(56) References Cited

U.S. PATENT DOCUMENTS

| | | | |
|---|---|---|---|
| 138,447 A | 4/1873 | Stevenson | |
| 409,723 A | 8/1889 | Wood | |
| 426,783 A | 4/1890 | Downs | |
| 584,396 A | 6/1897 | McNulty | |
| 1,060,811 A | 5/1913 | Bowers | |
| 1,357,137 A | 10/1920 | Barwick | |
| 1,398,850 A * | 11/1921 | Franco | A01B 1/16 294/50.6 |
| 1,710,039 A * | 4/1929 | Bauer | A01B 1/12 172/380 |
| 1,886,560 A * | 11/1932 | Lee | A01B 1/12 172/375 |
| 1,971,689 A * | 8/1934 | Mamay | A47J 17/04 30/123.7 |
| 2,010,478 A * | 8/1935 | Burton | A01D 1/06 30/165 |
| 2,335,497 A * | 11/1943 | Ehrsam | B23P 15/40 30/142 |
| 2,419,719 A * | 4/1947 | Kennedy | A01B 1/06 172/372 |
| 2,635,337 A * | 4/1953 | Mercy | B26B 3/08 30/353 |
| 3,101,539 A | 8/1963 | Walters | |
| 3,280,457 A | 10/1966 | Lewis et al. | |
| 3,729,065 A * | 4/1973 | Baskerville | H01H 3/30 185/39 |
| 4,100,636 A | 7/1978 | Ott et al. | |

(Continued)

OTHER PUBLICATIONS

Author/Publisher: Wikipedia, Title: List of shortest people, Date last edited: Sep. 11, 2015, https://en.wikipedia.org/wiki/List_of_shortest_people, 8 pages.

(Continued)

*Primary Examiner* — Ghassem Alie
*Assistant Examiner* — Fernando A Ayala
(74) *Attorney, Agent, or Firm* — R. Randall Frisk (57) ABSTRACT

A cutting tool includes a blade having opposing front and back edges and inner and outer ends and defining at least two cutting loops, each cutting loop having a sharpened cutting edge and extending from an opening at the back edge and sloping therefrom toward the front edge and outer end at a loop angle of between about 35 and 55 degrees, the cutting loops each also having a depth from the back edge of between about 0.2 inches and 0.75 inches; and a handle at the inner end of the blade.

20 Claims, 5 Drawing Sheets

(56) References Cited

U.S. PATENT DOCUMENTS

| | | | | |
|---|---|---|---|---|
| 4,170,061 | A * | 10/1979 | Henry | B26B 1/046 |
| | | | | 30/160 |
| 4,627,165 | A | 12/1986 | Gibson | |
| 5,077,901 | A * | 1/1992 | Warner | B23P 15/40 |
| | | | | 30/346.53 |
| 5,359,778 | A * | 11/1994 | Seber | B26B 3/06 |
| | | | | 30/294 |
| 5,448,833 | A * | 9/1995 | Coon | B23D 51/01 |
| | | | | 30/142 |
| 6,293,020 | B1 * | 9/2001 | Julien | B21K 11/02 |
| | | | | 30/346.53 |
| 6,837,896 | B2 * | 1/2005 | Matsutani | A61B 17/3211 |
| | | | | 30/346 |
| 8,250,767 | B1 * | 8/2012 | Ciccarella | B26B 3/08 |
| | | | | 30/314 |
| 2004/0016132 | A1 * | 1/2004 | Dion | B23D 65/00 |
| | | | | 30/350 |
| 2006/0242843 | A1 | 11/2006 | Schoenberg | |
| 2010/0101100 | A1 | 4/2010 | Hansen et al. | |

OTHER PUBLICATIONS

Author/Publisher: Wikipedia, Title: List of tallest people, Date last edited: Sep. 28, 2015, https://en.wikipedia.org/wiki/List_of_tallest_people, 27 pages.

* cited by examiner

VINE CUTTING TOOL AND METHOD FOR MAKING AND USING SAME

CROSS-REFERENCE TO RELATED APPLICATION

This application is a continuation of Patent Application No. 14/067,418, filed Oct. 30, 2013, which application is hereby incorporated by reference in its entirety.

FIELD OF THE INVENTION

The present invention relates to the field of cutting tools, and more specifically, to a tool for cutting vines, plant stems and the like.

BACKGROUND OF THE INVENTION

Vines, plant stems and the like are often desired to be removed from around tree trunks and other structures. Some of such vines grow so close to the tree or structure that it is difficult to cut the plant without damaging the tree or structure. In the case of poison ivy or plants with thorns, it may be difficult to maneuver a cutting tool close enough to cut the offending plant. What is needed is a tool that easily and safely permits the cutting and removal of offending vines and similar plants growing close to trees and other structures.

SUMMARY OF THE INVENTION

Generally speaking, a cutting tool for cutting vines and similar plants growing close to trees and other structures. In one embodiment, a cutting tool includes a blade having opposing front and back edges and inner and outer ends and defining at least two cutting loops, each cutting loop having a sharpened cutting edge and extending from an opening at the back edge and sloping therefrom toward the front edge and outer end at a loop angle of between about 35 and 55 degrees, the cutting loops each also having a depth from the back edge of between about 0.2 inches and 0.75 inches; and a handle at the inner end of the blade.

It is an object of the present invention to provide a cutting tool for cutting vines and other stemmed foliage growing close to trees and other structures.

Further objects and advantages of the present invention will become apparent from the following description of the preferred embodiment.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, and any alterations and modifications in the illustrated device, and further applications of the principles of the invention as illustrated therein are herein contemplated as would normally occur to one skilled in the art to which the invention relates.

Figures 1, 2, 3, 4:
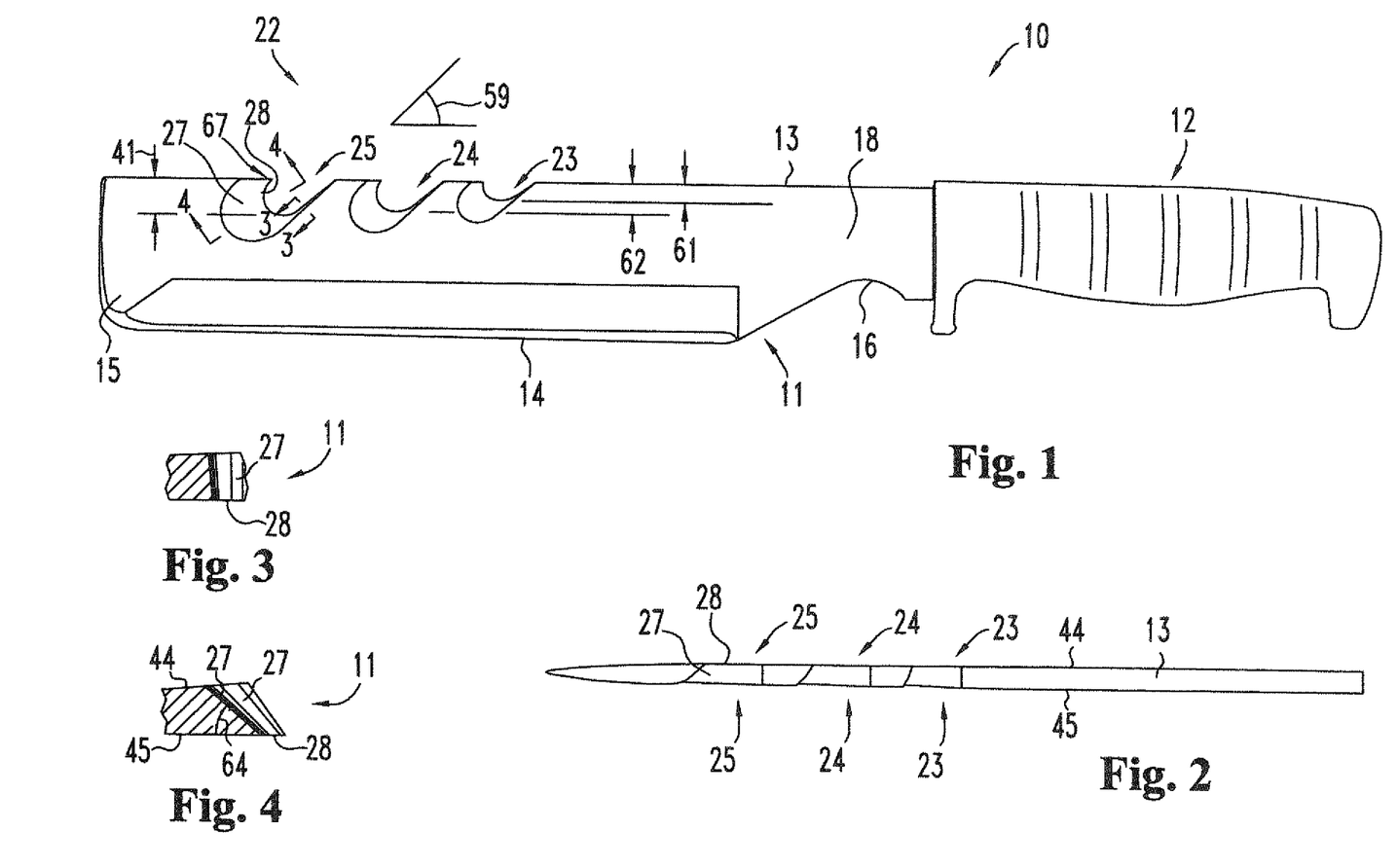
FIG. 1 is a plan view of a cutting tool 10 in accordance with the present invention.
FIG. 2 is a side view showing the back edge 13 of the cutting tool 10 of FIG. 1.
FIG. 3 is s cross-sectional view of the cutting tool 10 of FIG. 1 taken along the lines 3--3 and viewed in the direction of the arrows.
FIG. 4 is s cross-sectional view of the cutting tool 10 of FIG. 1 taken along the lines 4--4 and viewed in the direction of the arrows.

Referring to FIG. 1, there is shown a cutting tool 10 in accordance with the present invention. Tool 10 generally includes a blade 11 and a handle 12. Blade 11 includes a back edge 13, an opposing, front cutting edge 14, an outer end 15 and an inner end 16 with a ricasso 18. The cutting tool 10 of FIG. 1 generally has the size and shape of a machete. That is, the blade 11 is about 12 to 14 or more inches long, about 1½ inches wide and about 0.12 inches thick, which gives the blade substantial strength and heft to facilitate its use in cutting vines and similar foliage, as described herein. Reference to grabbing, ensnaring and cutting a vine is intended to mean and include any foliage element with a rod-like shape (such as a vine, branch, twig, stem, tendril and the like) that is sized to fit within any one of the cutting loops 22 described herein. As with some machetes, the back edge 13 may be serrated (not shown), sharpened (not shown) or smooth (unsharpened), as shown, and the opposing edge 14 is honed to a knife edge. It is contemplated that the opposing edges 13 and 14 of blade 11 have any edge configuration desired to facilitate its use, including, but not limited to the aforementioned configurations—smooth, serrated, and sharpened.

Referring to FIGS. 1 and 2, there are defined in and along the back edge 13 a series of cutting loops 22 that slope from their opening at back edge 13 frontwardly and away from handle 12 (toward front edge 14 and outer end 15), as shown. In the embodiment of FIG. 1, there are three cutting loops—inner loop 23, middle loop 24 and outer loop 25, but alternative embodiments are contemplated wherein there are fewer or more cutting loops 22. The cutting loops 23-25 have mutually similar configurations, and only outer cutting loop 25 will be described, with any differences among the cutting loops 23-25 being otherwise described. Cutting loop 25 is machined to form a slanted cutting surface 27, which terminates at an arcuate cutting edge 28. Cutting edge 28 is C-shaped or loop-shaped or crescent-shaped or simply arcuate, depending on the method by which it is formed.

Figure 5:
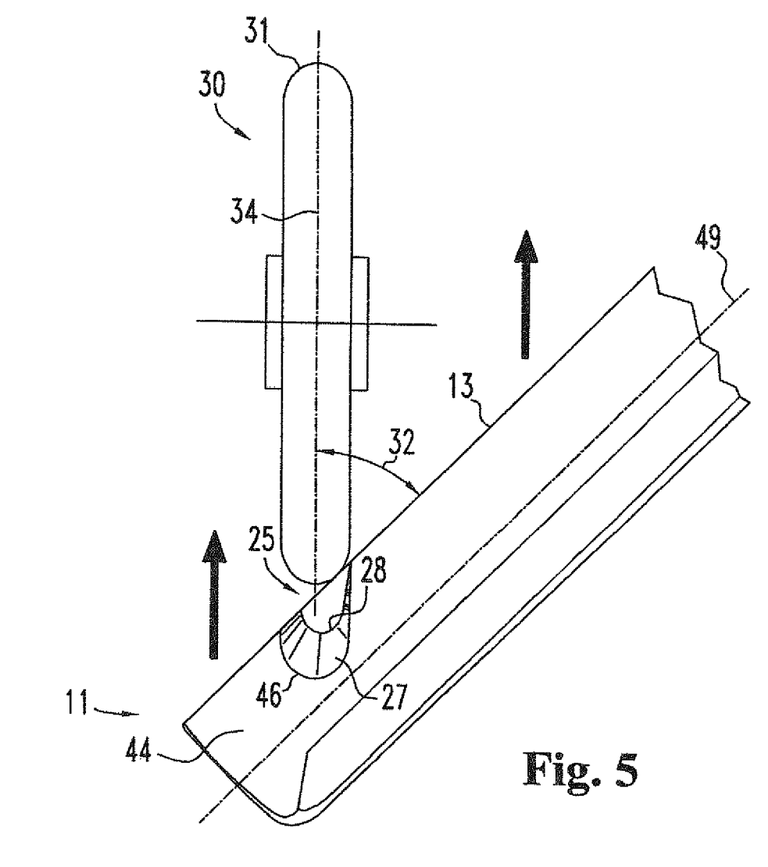
FIG. 5 is a front view of the cutting tool 10 of FIG. 1 showing orientation of the blade in relation to the grinding wheel 30 during creation of a cutting loop 25.
Figure 6:
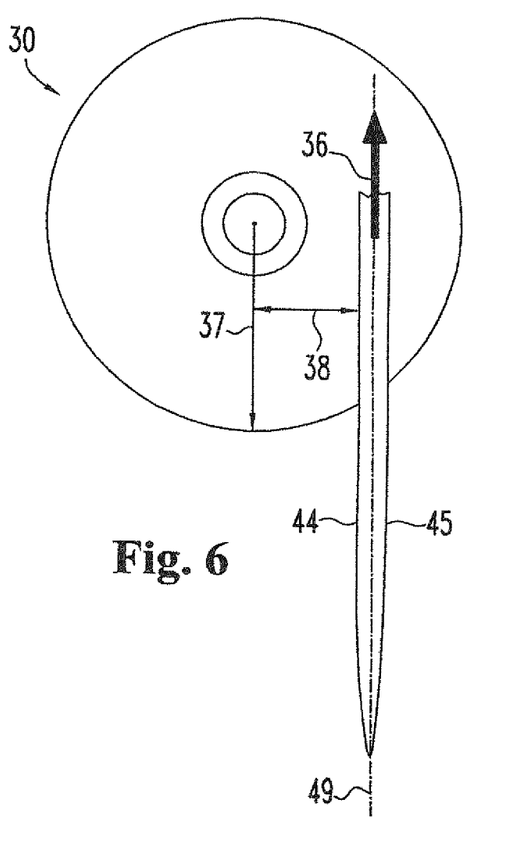
FIG. 6 is a side view of the cutting tool 10 and grinding wheel 30 of FIG. 5.

Referring to FIGS. 5 and 6, one method of forming cutting loop 25 is by grinding away a portion of a blade 11 using a grinding wheel 30, the outer edge 31 of which is shaped to help define the desired shape of the loop 25, slanted cutting surface 27 and arcuate cutting edge 28. In this method, blade 11 is positioned so that its back edge 13 is at an entry angle 32 relative to the plane of rotation 34 of a grinding wheel 30 (as shown in FIG. 5), and the blade 11 is advanced into the wheel 30 along a line 36 that is parallel to, but offset from a radial line 37 of the cutting wheel 30, as shown in FIGS. 5 and 6. Such offset is in a direction 38 perpendicular to the radial line 37. The depth 41 (FIG. 1) of cutting loop 25 from back edge 13 is defined by how far along advancement line 36 blade 11 is moved once grinding contact begins at back edge 13—the greater the advancement, the deeper the loop. Because blade 11 is offset a distance 38 from radial line 37, grinding wheel 30 will grind more away on the top surface 44 of blade 11 than on its opposite, bottom surface 45. The resulting configuration includes the slanted cutting surface 27 intersecting the blade's bottom surface 45 to form the arcuate cutting edge 28. At its top end, slanted cutting surface 27 intersects the blade's top surface 44 to form trailing edge 46. The shape and configuration of the cutting edge 28 and slanted cutting surface 27 can further be defined during the grinding process by rotating the blade 11 about other lines, such as a pivot line 49 running somewhere down the length of blade 11, such as shown in FIGS. 5 and 6. The orientation of blade 11 during the grinding process can be set before and remain constant during the grinding step (that is, blade 11 can be positioned, such as is shown in FIGS. 4 and 5, and then advanced along line 36), or as blade 11 is advanced along line 36, its entry angle 32 can be varied and/or it can be rotated about its pivot line 49. By varying these blade orientations—offset distance 38, entry angle 32, rotation about pivot line 49 and extent of advancement along advancement line 36—the shape and configuration of cutting loop 25 can be made to effect a desired cutting action.

Figure 7:
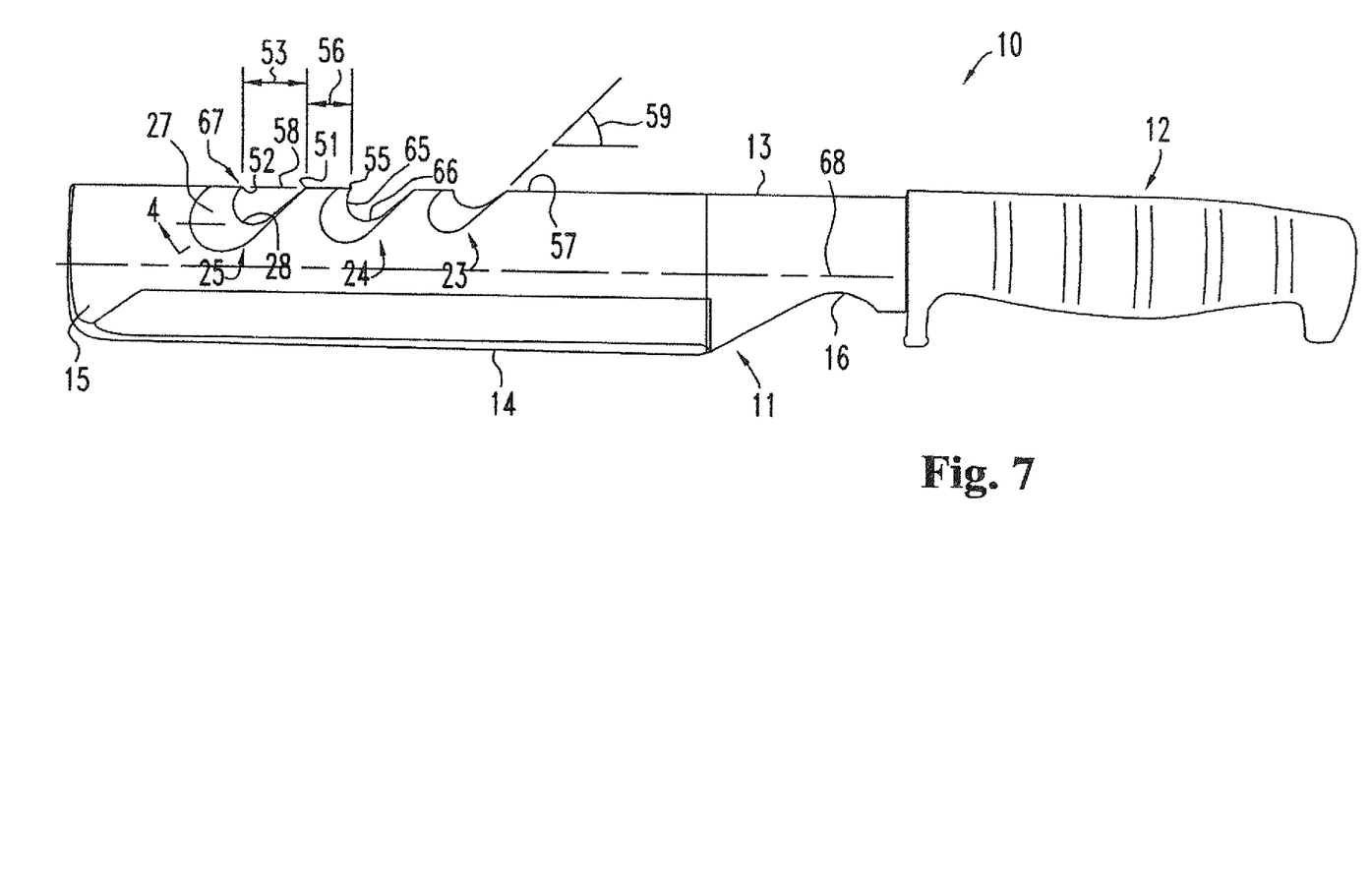
FIG. 7 is a plan view of the cutting tool 10 of FIG. 1 showing the loop angle 59 and loop spacings.

Referring to FIGS. 1, 4 and 7, the intersection of cutting edge 28 with bottom surface 45 and with back edge 13 defines leading and trailing loop entry corners 51 and 52, respectively. The distance between opposing loop entry corners (such as corners 51 and 52 of loop 25) defines the loop opening width (e.g. the loop opening width 53 of outer loop 25), and the distance between the leading entry corner of one loop and the trailing corner of an immediately adjacent loop (such as leading corner 51 of outer loop 25 and trailing corner 55 of middle loop 24) defines the spacing between such adjacent loops (e.g. the spacing 56 between middle loop 24 and outer loop 25). The loop opening width of any of the loops 22 is contemplated to be between about 0.3 inches and 0.75 inches, with an optimum range being between about 0.4 inches and 0.65 inches. In one preferred embodiment, the loop opening width of all three loops is about 0.45 inches. The loop spacing between any adjacent loops 22 is contemplated to be between about 0.3 inches and 0.75 inches, with an optimum range being between about 0.4 inches and 0.65 inches. In one preferred embodiment, the loop spacing of all three loops is about 0.45 inches.

Back edge 13 is generally straight and, proximal the region of the loops 23-25, defines a generally straight drag line 57. Away from the region of loops 23-25, that is, near the outer and/or inner ends 15 and 16, back edge 13 may or may not lie in the same generally straight line as drag line 57. Leading and trailing loop entry corners 51 and 52 define an entry line 58 that is generally coextensive with the drag edge 57. Alternative embodiments are contemplated wherein the leading loop entry corner 51 is slightly higher (that is, about up to 0.2 inches) than the trailing loop entry corner 52 relative to drag line 57, and thus the entry line 58 would be inclined relative to drag line 57.

In the embodiment of FIGS. 1-7, there are three cutting loops 23-25, which are of increasing size, the smallest (inner loop 23) being closest to hilt 12, and the largest (outer loop 25) being closest to outer end 15. The entry angle 32 of grinding produces a loop angle 59 for each loop 23-25 of between about 35 and 55 degrees, with a preferred entry angle 32 of between about 40 and 50 degrees, and the optimum entry angle 32 is about 45 degrees. The entry angle 32 and loop angle being identical and interchangeable, the plane of rotation line at 34 thus also defines and represents the loop axis (34) that defines the slope of each cutting loop 22 relative to back edge 13. The depths 61, 62 and 41 of the three loops 23-25 are about 0.25 in., 0.40 in. and 0.48 in., respectively. Also in this one embodiment, slanted cutting surface 27 forms a maximum angle 64 (which constitutes the sharpness of cutting edge 28) with bottom surface 45 of about 50 degrees. Alternative embodiments are contemplated wherein the depths of any or all of the loops 22 is as little as 0.2 inches and as much as 0.75 inches. The larger the loop 22 (the greater its depth), the larger is the vine that may cut-or that one may try to cut. Some very hard wooded vines or large diameter vines may not easily be cut by a blade of a tool such as the present tool 11, and it is believed that too large of a loop opening (regardless of how sharp the cutting edge is) may result in recurring failure to cut. A maximum loop depth (loop size) is therefore contemplated, but such maximum loop size may be determined on a case-by-case basis depending on the variety of vine to be cut. Alternative embodiments are contemplated wherein any of the aforedescribed characteristics can be varied to effect slightly different performance from cutting tool 10. For example, a sharper cutting edge 28 (increasing the angle of cutting surface relative to bottom surface 45) can be obtained by increasing the offset 38 during grinding. A deeper cutting loop can be obtained by advancing blade 11 farther into the cutting wheel 30.

Figures 8, 9:
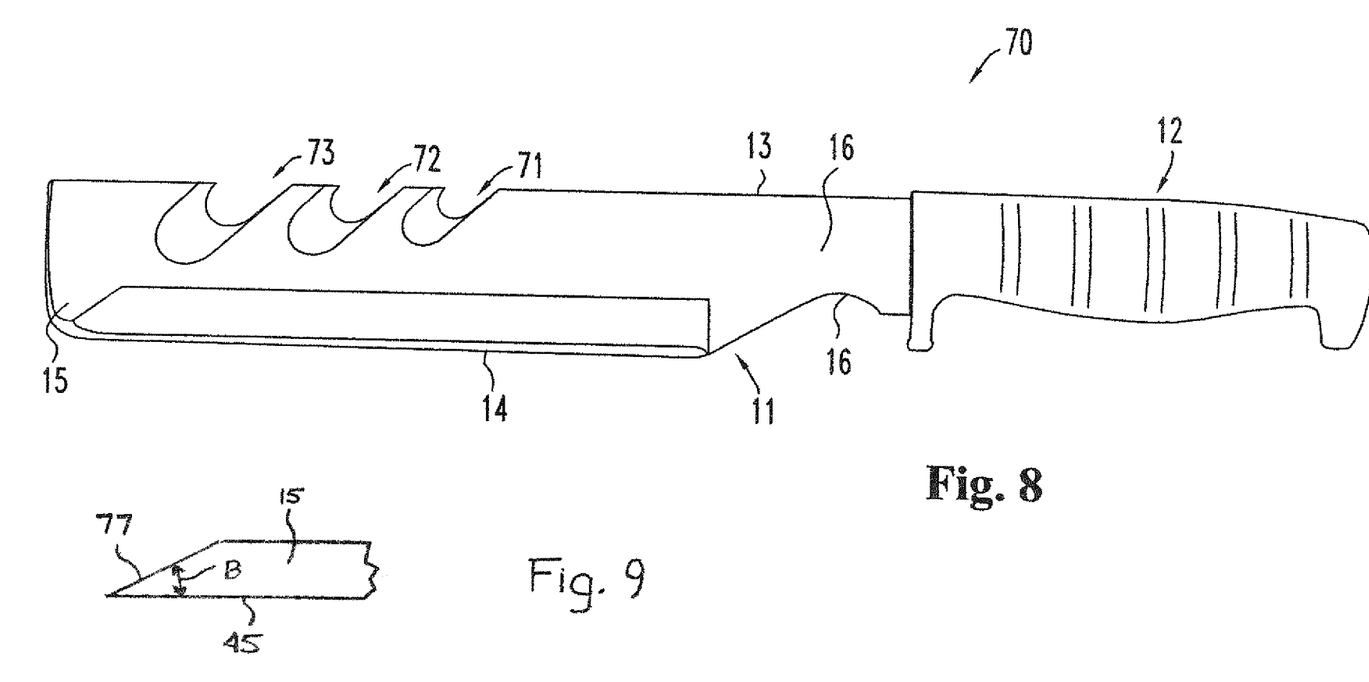
FIG. 8 is a side view of a cutting tool 70 in accordance another embodiment of the present invention.
FIG. 9 is a top view of the outer end 15 of a blade 11 of a cutting tool 10 in accordance with another embodiment of the present invention.

In the embodiment of FIG. 1, the trailing loop entry corner 55 of the middle loop 24 is closer to the hilt 12 than the outermost portion 65 of its corresponding cutting edge 66, which means loop 24 has a hook shape with hook point (at 55) that is then well adapted to grab and cut a vine or similar piece of foliage that is positioned therein. Outer loop 25 is similarly hook-shaped with its hook point at 52. In FIG. 8 there is shown a cutting tool 70 in accordance with an alternative embodiment of the invention wherein all of the loops 71-73 are hook shaped. It is contemplated that three loops are optimum and that all are hooked shaped so that each loop can ensnare an offending vine or similar foliage and, with a sharp pull, cut such vine.

Alternative embodiments are contemplated wherein neither, either or both opposing edges 13 and 14 has more than one edge treatment. For example, in one embodiment, the back edge 13 may be smooth (unsharpened) along some portion at and/or near its outer end 15, and may be sharpened along some portion at and/or near its inner end 16. This configuration enables the first "pull" of the tool 10 to slightly cut some portion of the vine so that it is more easily severed by the loops 22.

Figure 11:
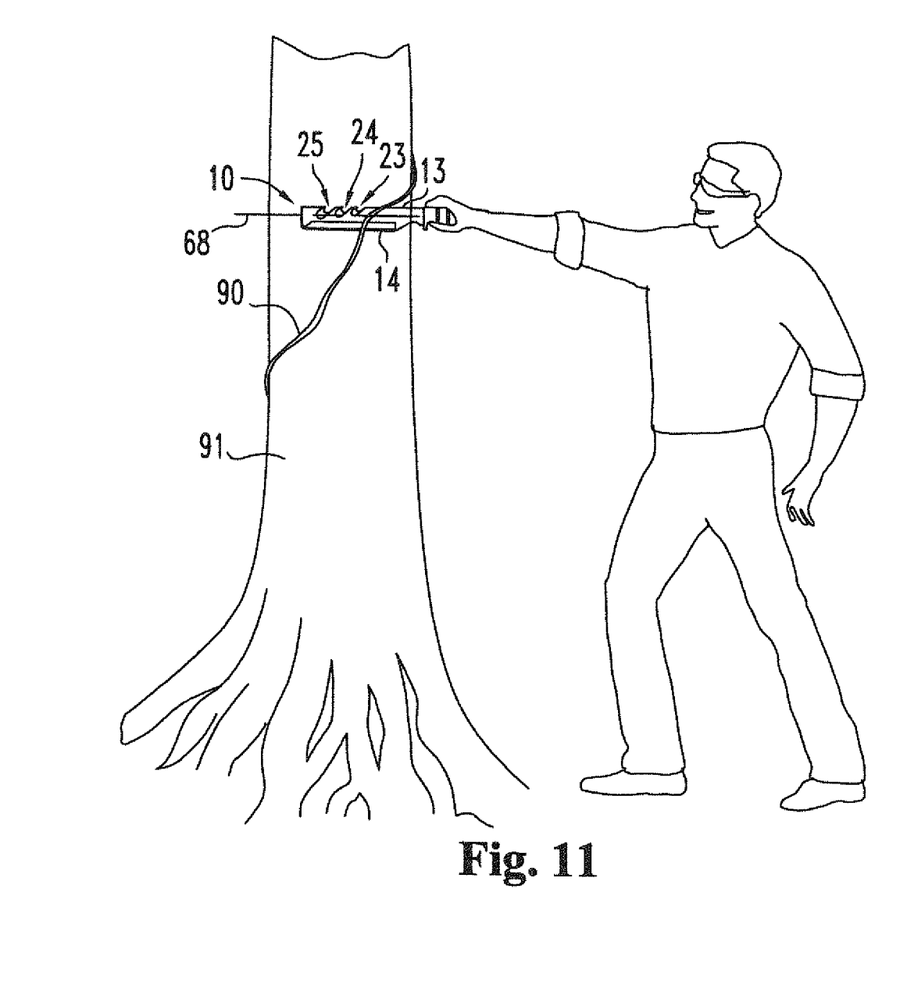
FIG. 11 is a side view of the cutting tool 10 of FIG. 1 shown inserted between a vine 90 and tree 91.
Figure 12:
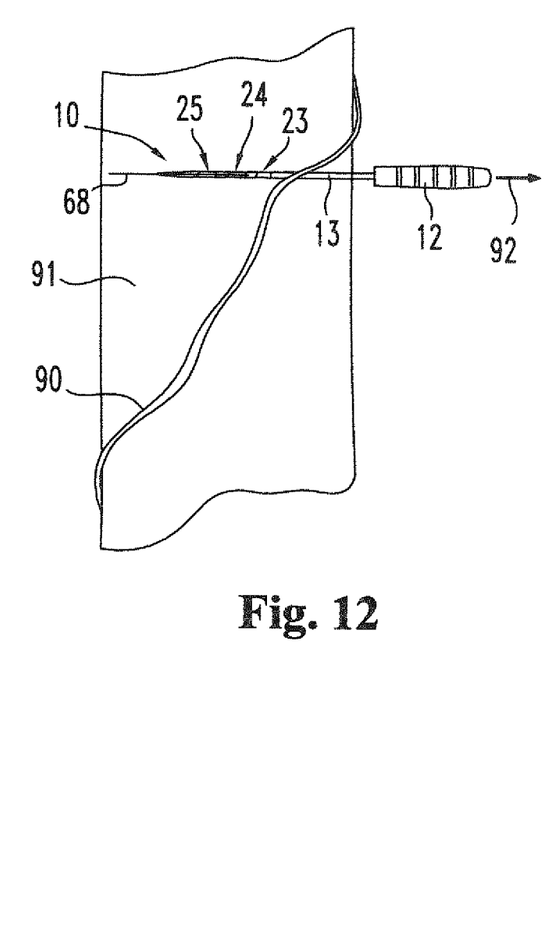
FIG. 12 is a partial and enlarged view of the cutting tool 10, vine 90 and tree 91 of FIG. 11, with the tool 10 shown turned about its axis 68 and ready for pulling to cut the vine 90.

In one intended use and referring to FIGS. 11 and 12, the tool is used to cut the types of vines 90 (such as poison ivy and the like) that grow up the side of a tree 91 (or other structure). A machete or similar cutting tool swung toward the tree can damage the tree. Cutting tool 10, however, can be inserted between the vine 90 and tree 91 (FIG. 11), turned generally about its central axis 68 so that the front edge 14 is proximal the tree and the back edge 13 and cutting loops 23-25 face outwardly from the tree and are proximal to and are aligned with or are outwardly of the vine or vines 90 desired to be cut (that is, in the latter case, one or more of the vines 90 are closer to the hilt 12, as shown in FIG. 12). Tool 10 is then either yanked quickly in the direction (92) of the handle, whereby the vine or vines 90 fall into one or more of the cutting loops 23-25 and are cut by the arcuate cutting edges 28, or the tool 10 is first pulled slightly until one or more vines 90 enter one or more loops 23-25, and the tool 10 is then yanked so that the cutting edges 28 cut the offending vines.

Where the vines may be particularly stubborn, the user can grasp tool 10 with one hand on the handle and the other hand on the unsharpened ricasso to impart greater pulling force with two hands.

It is also contemplated that cutting tool 10 can also be swung, leading with the back edge 13, toward the brush or vines desired to be cut, and then yanked in the direction of arrow 35, whereupon the vines having central stems small enough to fit within the cutting loops 23-25 enter one or more of such loops 23-25 and are cut thereby when the tool is yanked.

As used herein, a loop or cutting loop means a slot defined in blade 10 that is sloped from its opening at back edge 13 toward outer end 16 and has a cutting edge (as at 28) either at bottom surface 45, top surface 44 or somewhere therebetween.

Alternative embodiments are contemplated wherein one or more of the loops are formed by means other than a grinding wheel 30. For example, the loops 22 may be formed using a laser or hydro cutting device or may be creating using a hand tool with a grinding or other cutting bit or tool. Alternatively, blade 11 could be cast into the desired shape with final finishing (such as deburring and sharpening) performed by appropriate and known tools and methods. Blade 11 is contemplated to be made of any appropriate material that can be shaped, formed, cast, cut, and sharpened such as metal.

Figure 10:
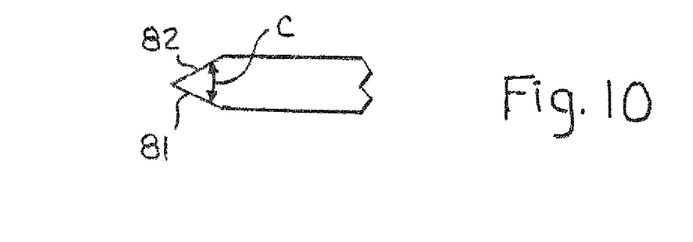
FIG. 10 is a top view of the outer end 15 of a blade 11 of a cutting tool 10 in accordance with another embodiment of the present invention.

Alternative embodiments are contemplated wherein handle 12 is integrally formed with blade 11 or has a shape, size or configuration other than is shown in FIGS. 1-7. Thus, vine cutting tool 10 still has a blade 11 and a handle 12, but in one embodiment, the blade 11 and handle 12 are formed together as a single piece. Referring to FIG. 9, the leading or outer end 15 of blade 11 is beveled to form a beveled entry surface, which here is a single entry surface 77 which, as opposed to a blade having a blunt outer end (that is, squared off, rounded off, and/or having little or no appreciable beveling), helps maneuver blade 11 into position between the vine and tree (or other structure). Single entry surface 77 forms a single tip entry angle B relative the bottom surface 45 of between about 20° and 40°, with a preferred angle B of about 30°. Alternative embodiments are contemplated wherein single entry surface 77 is formed with the prescribed angle B relative to the top surface 45 instead of bottom surface 44. FIG. 10 shows an alternative embodiment wherein both the bottom and top surfaces 44 and 45 of blade 11 are beveled to form two beveled entry surfaces, which here are bottom and top entry surfaces 81 and 82. Bottom and top entry surfaces 81 and 82 form a combined tip entry angle of C between about 20° and 60°, with a preferred combined tip entry angle C of about 35°.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. A vine cutting tool comprising:
   a blade having opposing front and back edges, opposing top and bottom surfaces and inner and outer ends and defining at least two cutting loops, each having a sharpened cutting edge and extending from an opening at the back edge and sloping therefrom toward the front edge and outer end at a loop angle of between about 35 and 55 degrees, the at least two cutting loops each being disposed entirely between the front and back edges and having a depth from the back edge of at least 0.2 inches, and wherein the cutting edge of each loop has an outermost portion closest to the blade outer end, and wherein the intersections of at least one of the loops with the blade back edge defines leading and trailing loop entry corner which are both closer to the blade inner end than the outermost portion of such at least one loop, and wherein the depth of one of the at least two cutting loops is greater than the depth of the other of said at least two cutting loops; and wherein the loop closer to the outer end is the outer loop and the loop closer to the inner end is the inner loop, and the depth of the inner loop is less than the depth of the outer loop; and
   a handle at the inner end of said blade.

2. The vine cutting tool of claim 1, wherein the back edge defines a drag line and each cutting loop has a leading and trailing loop entry corner that defines an entry line, and wherein the entry line is substantially coextensive with the drag line.

3. The vine cutting tool of claim 1, wherein there are at least three of said at least two cutting loops, which include an inner, a middle and an outer loop, each cutting loop having a sharpened cutting edge.

4. The vine cutting tool of claim 1, wherein the loop angle is between about 40 and 50 degrees.

5. The vine cutting tool of claim 4 wherein the loop angle is about 45 degrees.

6. The vine cutting tool of claim 3 wherein two of said at least two cutting loops define a loop spacing between adjacent loops, the loop spacing being between about 0.3 and 0.75 inches.

7. The vine cutting tool of claim 6 wherein the loop spacing is between about 0.4 and 0.65 inches.

8. The vine cutting tool of claim 7 wherein the loop spacing is about 0.45 inches.

9. The vine cutting tool of claim 1, wherein at least a portion of the bottom surface of the blade lies in a bottom plane, and at least a portion of the cutting edge is lies in the bottom plane.

10. The vine cutting tool of claim 1, wherein the depth of the inner loop is between 0.08 inches and 0.23 inches less than the depth of the outer loop.

11. The vine cutting tool of claim 3 wherein the depth of the inner loop is less than the depth of the middle loop which is less than the depth of the outer loop.

12. The vine cutting tool of claim 11 wherein the depth of the inner loop is between 0.08 inches and 0.23 inches less than the depth of the outer loop.

13. A method for cutting a vine proximal a structure, comprising the steps of:
   providing a vine cutting tool having a blade having opposing front and back edges, opposing top and bottom surfaces and inner and outer ends and having a handle at the inner end of the blade, and wherein the blade defines at least two cutting loops, each having a sharpened cutting edge and extending from an opening at the back edge and sloping therefrom toward the front edge and outer end at a loop angle of between about 35 and 55 degrees, the at least two cutting loops each also having a depth from the back edge of at least 0.2 inches, and wherein the at least two cutting loops are each disposed entirely between the front and back edges, and wherein the cutting edge of each loop has an outermost portion closest to the blade outer end, and wherein the intersections of at least one of the loops with the blade back edge defines leading and trailing loop entry corners which are both closer to the blade inner end than the outermost portion of such at least one loop, and wherein the depth of one of the at least two cutting loops is greater than the depth of the other of said at least two cutting loops, and wherein the loop closer to the outer end is the outer loop and the loop closer to the inner end is the inner loop, and the depth of the inner loop is less than the depth of the outer loop;

inserting the blade, outer end first, between the vine and the structure;

turning the blade so that the front edge is most proximal to the structure and the back edge is most proximal to the vine; and yanking said tool in the direction of the handle.

14. The method for cutting a vine proximal a structure of claim 13 wherein the providing step includes the loop angle being about 45 degrees and the depth being between about 0.3 inches and 0.75 inches.

15. The method for cutting a vine proximal a structure of claim 14 wherein the providing step includes two of said at least two cutting loops defining a loop spacing between adjacent loops, the loop spacing being between about 0.3 and 0.75 inches.

16. The method for cutting a vine proximal a structure of claim 15 wherein the providing step includes the loop spacing being between 0.45 inches.

17. The method for cutting a vine proximal a structure of claim 13 wherein the providing step includes the at least two cutting loops being at least three cutting loops.

18. The method for cutting a vine proximal a structure of claim 13 wherein the providing step includes at least a portion of the bottom surface of the blade lying in a bottom plane, and at least a portion of the cutting edge lying in the bottom plane.

19. The method for cutting a vine proximal a structure of claim 18 wherein the providing step includes at least a portion of the top surface of the blade lying in a top plane substantially parallel to the bottom plane, and wherein at least a portion of the cutting edge lies in neither the top or bottom plane.

20. A vine cutting tool, comprising:

a blade having opposing front and back edges, opposing top and bottom surfaces and inner and outer ends and defining at least two cutting loops, each having a sharpened cutting edge and extending from an opening at the back edge and sloping therefrom toward the front edge and outer end at a loop angle of 55 degrees or less, the at least two cutting loops each being disposed entirely between the front and back edges, and wherein the cutting edge of each loop has an outermost portion closest to the blade outer end, and wherein the intersections of at least one of the loops with the blade back edge defines leading and trailing loop entry corners which are both closer to the blade inner end than the outermost portion of such at least one loop, and wherein the depth of one of the at least two cutting loops is greater than the depth of the other of said at least two cutting loops; and wherein the loop closer to the outer end is the outer loop and the loop closer to the inner end is the inner loop, and the depth of the inner loop is less than the depth of the outer loop.

* * * * *